(12) United States Patent
Kataria

(10) Patent No.: US 7,177,279 B2
(45) Date of Patent: Feb. 13, 2007

(54) BUFFER MANAGEMENT FOR MERGING PACKETS OF VIRTUAL CIRCUITS

(75) Inventor: Deepak Kataria, Edison, NJ (US)

(73) Assignee: Agere Systems Inc., Allentown, PA (US)

( * ) Notice: Subject to any disclaimer, the term of this patent is extended or adjusted under 35 U.S.C. 154(b) by 974 days.

(21) Appl. No.: 10/131,577

(22) Filed: Apr. 24, 2002

(65) Prior Publication Data

US 2003/0041218 A1 Feb. 27, 2003

Related U.S. Application Data

(60) Provisional application No. 60/285,930, filed on Apr. 24, 2001.

(51) Int. Cl.
*H04J 3/14* (2006.01)

(52) U.S. Cl. ............... 370/235; 370/397; 370/395.41; 370/412

(58) Field of Classification Search ............... None
See application file for complete search history.

(56) References Cited

U.S. PATENT DOCUMENTS

| | | | | |
|---|---|---|---|---|
| 5,426,640 A | * | 6/1995 | Hluchyj et al. | 370/235 |
| 5,689,499 A | * | 11/1997 | Hullett et al. | 370/235 |
| 5,764,641 A | * | 6/1998 | Lin | 370/412 |
| 5,867,480 A | * | 2/1999 | Thomas et al. | 370/230 |
| 5,901,139 A | * | 5/1999 | Shinohara | 370/232 |
| 5,901,147 A | * | 5/1999 | Joffe | 370/412 |
| 5,936,939 A | * | 8/1999 | Des Jardins et al. | 370/229 |
| 6,097,698 A | * | 8/2000 | Yang et al. | 370/231 |
| 6,151,299 A | * | 11/2000 | Lyon et al. | 370/229 |
| 6,980,516 B1 | * | 12/2005 | Wibowo et al. | 370/235 |
| 7,058,061 B2 | * | 6/2006 | Tanaka et al. | 370/395.1 |

* cited by examiner

*Primary Examiner*—Hassan Kizou
*Assistant Examiner*—Brian Roberts

(57) ABSTRACT

In one embodiment, an apparatus for coordinating merging of packets for one or more virtual circuits (VGs). Each packet of a VC comprising a sequence of cells terminates with an end of packet (EOP) cell. The apparatus comprises one or more buffers, a buffer controller, and a merge processor. Each buffer is configured to receive cells of an associated VC and a threshold value based on traffic of the VC. When a number of cells of a packet in a buffer exceeds the corresponding dynamic threshold value, a corresponding flag of the buffer is set. The buffer controller is configured to drop all cells of the current packet in response to a set flag of a corresponding buffer. The merge processor services each buffer in accordance with a scheduling method to transfer one or more packets from each buffer to an output packet stream.

23 Claims, 3 Drawing Sheets

BUFFER MANAGEMENT FOR MERGING PACKETS OF VIRTUAL CIRCUITS

CROSS-REFERENCE TO RELATED APPLICATIONS

This application claims the benefit of the filing date of U.S. provisional application No. 60/285,930, filed on Apr. 24, 2001.

BACKGROUND OF THE INVENTION

1. Field of the Invention

The present invention relates to transfer of data packets through a node in a telecommunications system, and, in particular, to merging packets of one or more virtual circuits into a single output data stream.

2. Description of the Related Art

Telecommunication systems typically employ a hierarchy to integrate multiple user data channels for transmission through a medium. Transmission through the medium at one level of the hierarchy is generally at a much higher rate than the rate of each user's data at a lower level of the hierarchy. Synchronous networks, such as cell relay (ATM or SONET) networks, may use a format in which data packets of individual virtual circuits (VCs) are merged into a single output stream. Similarly, data packets of VCs may be grouped at a system level according to traffic class. Data packets of VCs may be merged for each class into traffic class data streams, and these traffic class data streams are then merged into the single output stream.

FIG. 1 shows an exemplary prior art implementation for merging data packets of several VCs. Reassembly buffers 101–104 receive cells of data packets for corresponding VCs VC1–VC4. When cells of a complete packet are received into one of the reassembly buffers 101–104, a corresponding flag is set. VC merge server 105 performs a merge operation by continually checking and serving those reassembly buffers 101–104 having a flag set indicating that a full packet is present within the buffer. For example, VC merge server 105 may include a buffer server and a scheduler (not shown) that may implement a method of round-robin scheduling. A buffer service by VC merge server 105 moves one or more packets from one of the reassembly buffers 101–104 to output buffer 106. The data packets of the VCs VC1–VC4 are thus merged into the output buffer 106, and the contents of output buffer 106 is emptied (read out) as the single output stream.

Each data packet of a VC generally comprises one or more cells, with the last cell of the packet having a flag set to indicate that it is the end of packet (EOP) cell. Building a packet refers to the process of receiving the cells of a complete packet. Some data packets are quite long, and under some conditions, such as when there are many active VCs, VC merge server 105 may take longer to serve each reassembly buffer. Under these conditions, a reassembly buffer may overflow. An overflow of the buffer occurs when a cell input to the reassembly buffer exceeds this threshold before receiving the EOP cell. The reassembly buffers 101–104 are gated after a threshold (e.g., buffer length) is reached. When the threshold is reached, prior art implementations may either 1) drop the remaining cells of the packet being built, with the exception of the EOP packet, or 2) let the current packet finish being built (receive all cells up to the EOP cell) before denying access to future cells. In either case, the output stream includes the FOP cell for the currently built packet. If interveaning cells are dropped, the system allows corrupted packet information to pass to the output stream, thus wasting available capacity. If the system allows the current packet to finish being built, with very long packets, the reassembly buffer length may not be adequate to allow the packet to finish being built. Thus, to handle very long packets, the length of the reassembly buffer may be excessively long beyond the threshold, wasting available buffer capacity.

SUMMARY OF THE INVENTION

In accordance with embodiments of the present invention, a terminal receives cells of one or more virtual circuits (VCs) into corresponding reassembly buffers, with a packet of a VC defined as one or more cells having the last cell with an end of packet (EOP) indicator (an EOP cell). The terminal merges groups of VC packets that are stored in the reassembly buffers into a single output buffer for transmission. Buffer management detects buffer overflow to terminate building of the current packet in the reassembly buffer by comparison of each newly arrived cell with a threshold. The terminal may employ a packet discard mechanism, such as early packet discard, to generate dynamic threshold values for each VC buffer based on the VC packet traffic. When cells of a packet are admitted to a buffer and the threshold is exceeded, one of two events may occur. In the first event, the threshold is exceeded without receiving an EOP cell. The reassembly buffer is flushed and all subsequent cells are dropped (refused admission to the buffer) until the EOP cell for the dropped packet is received. Here, flushing a buffer may be dropping either all cells including those of complete packets, or just cells of an incomplete packet. The EOP cell is also dropped in the first event. In the second event, the dynamic threshold is exceeded when a cell is received, but the received cell is an EOP cell. For this second event, one of two actions may be taken: either 1) the EOP cell is dropped and the reassembly buffer flushed, or 2) the EOP cell is enqueued and access for future cells of the next packet(s) is denied. To maintain buffer length while enforcing provisioned quality of service guarantees, some embodiments of the present invention may employ a counter associated with each VC, the counter having an upper bound based on the dynamic threshold and a lower bound based on minimum guaranteed buffer size for the VC. The counter is decremented as each cell is enqueued in the reassembly buffer, and incremented at a constant rate related to the effective bandwidth of the VC. When the lower bound is met, admission of packets to the merge process is denied until the counter value increments above the lower bound.

In accordance with an embodiment of the present invention, packets for one or more virtual circuits (VCs) are merged, each packet of a VC comprising a sequence of cells terminating with an end of packet (EOP) cell. Cells are received at one or more buffers, each buffer configured to receive cells of an associated VC and a threshold value based on traffic of the VC, wherein, when a number of cells of a packet in a buffer exceeds the corresponding threshold value, a corresponding flag of the buffer is set. A buffer controller drops all cells of the current packet in the buffer response to a set flag of a corresponding buffer; and each buffer is served by a merge processor in accordance with a scheduling method to transfer one or more packets from each buffer to an output packet stream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
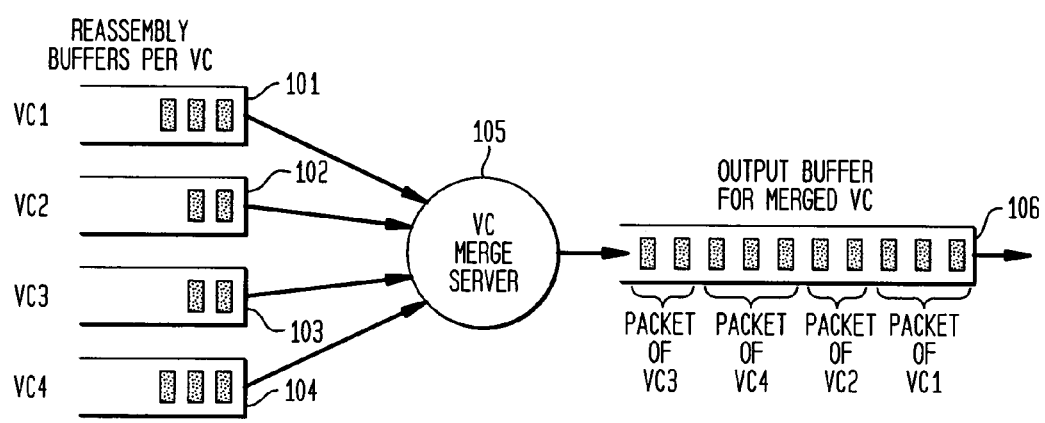
FIG. 1 shows an exemplary prior art implementation for merging data packets of several virtual circuits.
Figure 2:
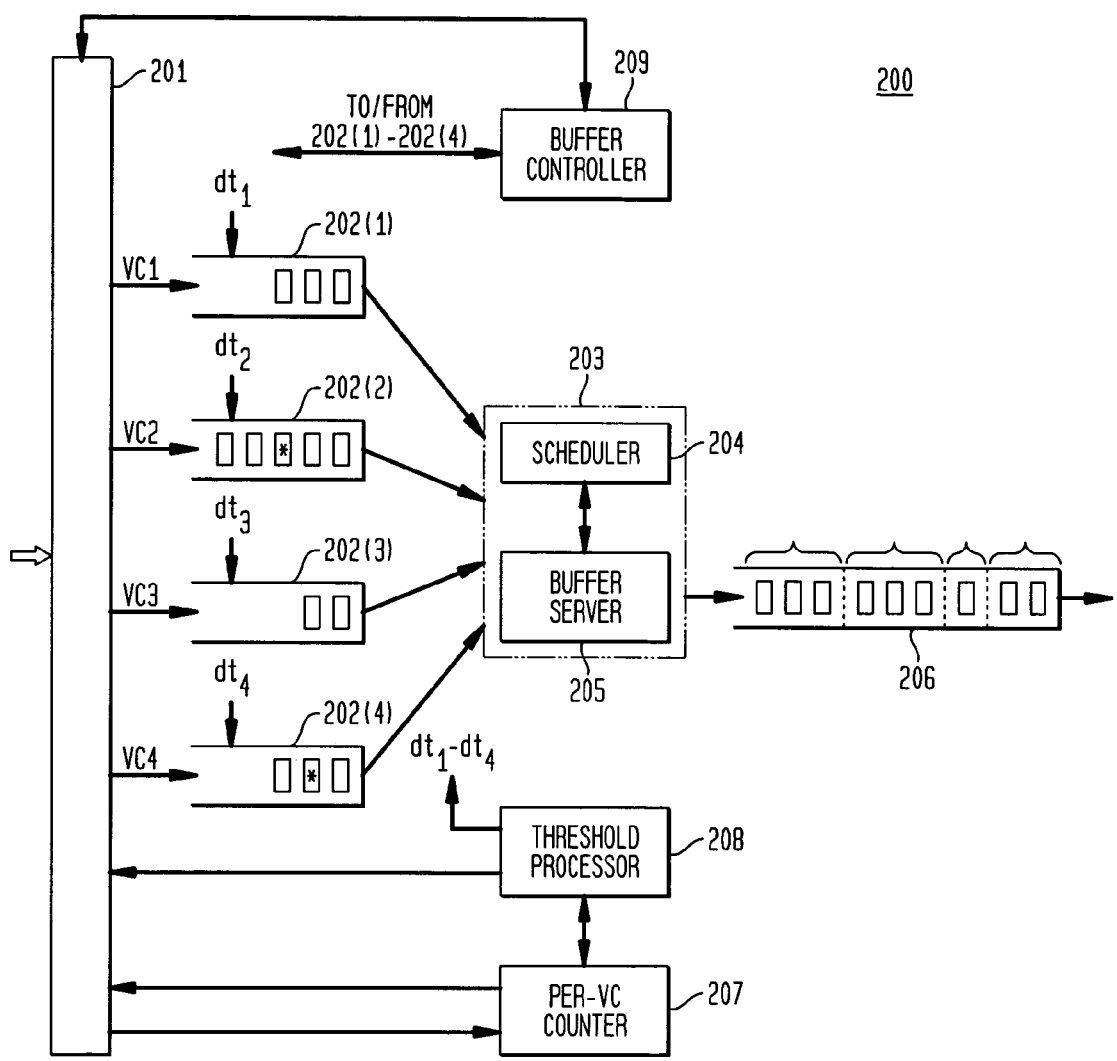
FIG. 2 shows an implementation for merging data packets of several virtual circuits in accordance with an exemplary embodiment of the present invention.

FIG. 2 shows an implementation for a terminal system 200 that merges data packets of several virtual circuits (VCs) in accordance with an exemplary embodiment of the present invention. As shown in FIG. 2, system 200 comprises: cell admission interface 201, reassembly buffers 202(1)–202(4), VC merge server 203 including scheduler 204 and buffer server 205, per-VC counter 207, threshold processor 208, and buffer controller 209. Cell admission interface 201 receives cells of packets that may conform to a standard transmission format, such as asynchronous transfer mode (ATM). Packets of a VC may be associated with specific user logical channels, and each packet may comprise one or more segments, termed cells. While the exemplary embodiments are described for asynchronous transfer mode (ATM) packet transport at a node for different VCs, the present invention is not so limited. The techniques described herein may be extended to merging packets in networks operating with other formats and for other types of provisioned network tunnel paths (NTPs) with packets defined by a sequence of one or more component segments.

Cell admission interface 201 directs each received cell of VCs VC1–VC4 to corresponding reassembly buffers 202(1)–202(4). Each of reassembly buffers 202(1)–202(4) compares the number of cells in its buffer to its corresponding one of dynamic threshold values $dt_1$–$dt_4$. Dynamic threshold values $dt_1$–$dt_4$ are generated as described subsequently with respect to the operation of threshold processor 208. If the number of cells in a reassembly buffer exceeds the corresponding dynamic threshold value, a corresponding buffer flag is set. When the buffer flag is set, this indicates that the buffer is at or near an overflow condition. System 200, therefore, takes steps to prevent buffer overflow.

Threshold processor 208 calculates each one of dynamic threshold values $dt_1$–$dt_4$ based on measured traffic statistics for VCs. Dynamic threshold values $dt_1$–$dt_4$ are set in accordance with a packet discard mechanism to drop cells and/or packets when the network is congested. Packet discard mechanisms include the Early Packet Discard (EPD) or Random Early Packet Discard (RED) methods that are well known in the art. Each threshold value is calculated and updated when the first cell in a new packet is enqueued in the corresponding reassembly buffer. As would be apparent to one skilled in the art, fixed threshold values may be employed that are determined "off-line" from measured traffic statistics and specific buffer implementations. However, the preferred embodiment is described for dynamic threshold calculation and for embodiments (described subsequently) that may maintain Quality of Service (QoS) guarantees for provisioned VCs.

In accordance with embodiments of the present invention, upon enqueuing of a cell within the reassembly buffer that exceeds the dynamic threshold of the buffer, system 300 may cause the reassembly buffer to be "flushed". As defined herein, a reassembly buffer may be flushed in at least two ways. First, all currently enqueued cells in the reassembly buffer are dropped from the buffer, whether complete packets are present in the buffer or not. Second, only those enqueued cells of the currently built packet in the reassembly buffer are dropped, leaving cells enqueued for any complete packet currently in the reassembly buffer.

Figure 3:
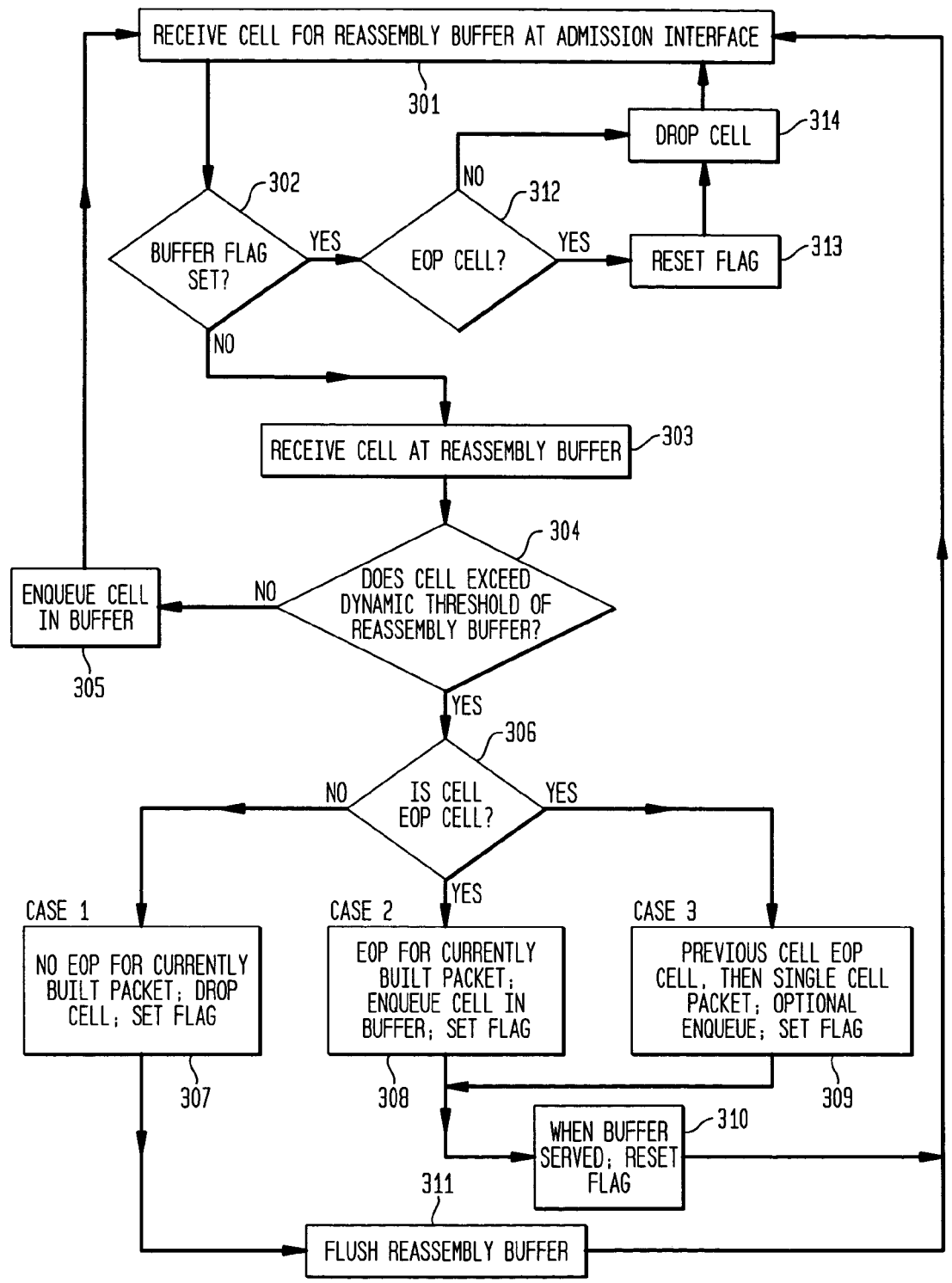
FIG. 3 illustrates an exemplary method of processing reassembly buffers for merging packets of virtual circuits.

FIG. 3 illustrates an exemplary method of processing each reassembly buffer for merging packets of VCs. At step 301, a cell arrives at the admission interface, and at step 302 at test determines whether the flag is set for the reassembly buffer corresponding to the newly arrived cell's VC, indicating that no further cells are to be admitted to the reassembly buffer. A set flag implies that the corresponding buffer has or will be flushed while in an overflow condition. Thus, either 1) the currently-built packet is or will be corrupted, and/or 2) a complete packet (which has an EOP indicator) is in the corresponding reassembly buffer when there is in an overflow condition. In accordance with the present invention, all cells including the EOP cell for the corrupted packet that is currently being built are dropped after the flag is set, and no new packets are admitted until the flag is reset.

Consequently, if the test of step 302 determines that the flag is set, at step 312, a test determines whether the cell is an EOP cell. If the test of step 312 determines that the cell is not an EOP cell, the cell is dropped at step 314, and the method returns to step 301 to wait for the next cell. If the test of step 312 determines that the cell is an EOP cell, the flag for the corresponding reassembly buffer is reset at step 313, the EOP cell is dropped at step 314, and the method returns to step 301 to wait for the next cell.

If the test of step 312 determines that the flag is not set, the method advances to step 303. Under these circumstances, the reassembly buffer may or may not have been flushed. Thus, at step 303, the cell is received at the reassembly buffer from the admission interface. At step 304, a test determines whether the newly arrived cell causes the number of cells in the reassembly buffer to exceed the dynamic threshold value. If the test of step 304 determines that the newly arrived cell does not cause the dynamic threshold to be exceeded, at step 305 the cell is enqueued in the corresponding reassembly buffer and the method returns to step 301 to await the next cell.

If the test of step 304 determines that the threshold is exceeded, at step 306 a test determines whether the newly arrived cell is an EOP cell. At step 306, one of three cases CASE1, CASE2, or CASE3 may be present. In the first case, CASE1, the newly arrived cell at the buffer is not an EOP cell, and the previously received cells currently in the buffer may either be part of a currently-built packet, or be a completed packet. If the test of step 306 determines that CASE1 is present, at step 307, the newly arrived cell is dropped and the flag is set for the corresponding reassembly buffer to deny admission of further cells. At step 311, the reassembly buffer is flushed, and the method returns to step 301 to await the next cell.

In the second case, CASE2, the newly arrived cell is the EOP cell for the currently built packet. If the test of step 306 determines that CASE2 is present, at step 308 the newly arrived cell is enqueued and the flag is set for the corresponding reassembly buffer to deny admission of further cells. No further cells are enqueued in the reassembly buffer until the buffer is served, at which time, at step 310, the flag is reset and the method returns to step 301 to await the next cell.

In the third case, CASE3, the newly arrived cell is a single cell packet, and so is also an EOP cell, and the reassembly buffer contains a completed packet (i.e., the previously received cell enqueued in the reassembly buffer is also an EOP packet). For CASE3, some embodiments may drop the newly arrived cell, while others may enqueue the single cell EOP packet. For these embodiments, after the newly arrived cell is processed, the corresponding flag is set to deny admission of further cells to the reassembly buffer. No further cells are enqueued in the reassembly buffer until the buffer is served, at which time, at step 310, the flag is reset and the method returns to step 301 to await the next cell.

Returning to FIG. 2, buffer controller 209 monitors reassembly buffers 202(1)–202(4), and provides control functions for the various elements of system 200. In particular, buffer controller 209 may implement one or more of the tests for newly arrived cells at each reassembly buffer, such as the test of the exemplary method shown in FIG. 3. Under some conditions, buffer controller 209 may generate signals to cell admission interface 201 to deny admission of further cells for one or more of reassembly buffers 202(1)–202(4).

For example, in accordance with VC provisioning terminal system 200 of FIG. 2 may be employed to maintain the queue length of the enqueued VC connections VC1–VC4 in the corresponding reassembly buffers 202(1)–202(4) (termed "tributary" queue length) within predetermined bounds. In addition, terminal system 200 may also be employed to maintain the queue length of the merged VC connections in output buffer 206. Maintaining queue length may be accomplished by enforcing the provisioned effective bandwidth of a VC connection. Consequently, some embodiments of the present invention may compare the cell enqueuing rate with the effective bandwidth of the VC connection. These embodiments employ the comparison to determine whether the effective bandwidth of the VC connection exceeds the effective bandwidth allowed for by the guaranteed effective bandwidth of the VC connection set during the provisioning process.

Thus, a background process monitors the enqueuing process of cells of VC connections VC1–VC4, and buffer controller 209 may employ this background process to detect when to gate or otherwise deny access of packets for specific VC connections VC1–VC4. Buffer controller 209 may then signal cell admission interface 201 to deny admission of further packets to that one of reassembly buffers 202(1)–202(4). The background process may be implemented by buffer controller 209 using measures for each VC connection VC1–VC4 that are generated by per-VC counter 207. Admission control through monitoring of the enqueuing process at the cell level, in addition to the packet level update process of the dynamic threshold values, allows for maintenance of tributary queue length.

Per-VC counter 207 comprises a bank of counters (not shown in FIG. 2), each counter associated with one of VC connections VC1–VC4. Each counter of per-VC counter 207 1) increments at a constant rate based on the effective bandwidth of the VC connection and 2) decrements for each cell enqueued in the corresponding assembly buffer. The maximum boundary of the counter is set to the dynamic threshold of the corresponding reassembly buffer, but for some implementations may also be set to the effective buffer size (derived from the effective bandwidth of the VC). The minimum boundary of the counter is set to the provisioned minimum buffer size for the VC. For example, the counter associated with VC1 may have a maximum boundary based on $dt_1$ and a minimum boundary of the minimum provisioned buffer size guaranteed to packet connections of VC1.

Since the maximum boundary of each counter of per-VC counter 207 associated with VC1–VC4 is the corresponding dynamic threshold value $dt_1$–$dt_4$, reaching this value implies that the entire space of the corresponding reassembly buffer is available. For those implementations in which the maximum boundary is set to the effective buffer size, which is a buffer size sufficient to service the particular VC's packet traffic based on the effective bandwidth of the VC, the sufficient buffer size is completely available. Thus, when the counter reaches the upper, maximum boundary, processing such as in accordance with FIG. 4 begins. However, when the counter associated with a VC connection decrements, the counter may fall below the minimum boundary (considered as a negative value). A negative value indicates the effective bandwidth of the VC connection is exceeding its provisioned effective bandwidth value. When the counter value reaches a negative value for one of the VC connections VC1–VC4, no new packets are admitted to that one of reassembly buffers 202(1)–202(4).

The exemplary embodiment shown in FIG. 2 allows for merging of packets for several VCs, and the exemplary embodiment may be extended to VCs that are grouped according to traffic class. Traffic classes may be defined based on, for example, Quality of Service (QoS) guarantees that may be assigned during provisioning of connections within VCs. For example, a traffic class may be defined based on one or more of: available or effective bandwidth, overall delay, packet/cell dropping (either through buffer size or delay guarantees), or similar traffic characteristic. An alternative embodiment of the present invention includes several modules similar to the embodiment of FIG. 2 for merging data packets of several VCs in which each VC has packets that may be grouped according to traffic class.

For the alternative embodiment supporting multiple traffic classes, each of traffic classes 1 through N has an associated group of four assembly buffers. Packets of each group of assembly buffers associated with a particular traffic class are merged by a corresponding VC merge server, and provided to a merged traffic class output buffer. Packets of VCs corresponding to traffic classes 1 through N are merged in a manner similar to that described above with respect to VC merge server 203 of FIG. 2. An egress subport scheduling processor is employed to schedule service for each of the merged traffic class output buffers. The egress subport scheduling processor may typically implement a method of round-robin, or other cell-based, scheduling for serving the traffic class output buffers to read the contents of the buffers out as part of a single output datastream.

A node implementing buffer management in accordance with embodiments of the present invention may provide for the following advantages. Flushing a reassembly buffer and dropping all subsequent cells including the cell having an end-of-packet indicator prevents corrupted or otherwise useless cells from being transmitted and processed by the node. Using a counter incremented based on the effective bandwidth of the VC that has an upper bound of the dynamic threshold and a lower bound of the (minimum) guaranteed buffer size allows for traffic management in accordance with service level guarantees for each VC and/or VC traffic class. Thus, overall processing and transmission capacity of the node may be improved, while maintaining relative minimum levels for quality of service guarantees.

While the exemplary embodiments of the present invention have been described with respect to systems, as would be apparent to one skilled in the art, various functions may be implemented in the digital domain as processing steps in a software program, by digital logic, or in combination of both software and hardware. Such software may be employed in, for example, a digital signal processor, microcontroller or general-purpose computer. Such hardware and software may be embodied within circuits implemented in an integrated circuit.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for coordinating merging of packets for one or more virtual circuits (VCs), each packet of a VC comprising a sequence of cells terminating with an end of packet (EOP) cell, the apparatus comprising:
   one or more buffers, each buffer configured to receive cells of an associated VC and a threshold value based on traffic of the VC, wherein, when a number of cells of a packet in a buffer exceeds the corresponding dynamic threshold value, a corresponding flag of the buffer is set;
   a buffer controller configured to drop all cells of the current packet in response to a set flag of a corresponding buffer; and
   a merge processor servicing each buffer in accordance with a scheduling method to transfer one or more packets from each buffer to an output packet stream.

2. The invention as recited in claim 1, wherein the buffer controller drops all cells of the current packet by:
   1) denying further admission to the buffer of cells for the current packet to the buffer while its flag is set,
   2) dropping any current enqueued cells for the current packet in the buffer and drop each subsequent cell of the packet including its EOP cell, and
   3) resetting the flag of the corresponding buffer when the EOP cell is dropped to admit cells of a subsequent packet into the buffer.

3. The invention as recited in claim 1, further comprising a counter associated with each buffer, wherein the counter decrements as each cell is enqueued in the corresponding buffer and the counter increments at a rate based on the effective bandwidth of the VC of the corresponding buffer.

4. The invention as recited in claim 3, wherein each counter includes a minimum bound, and the buffer controller, in response to a counter reaching its minimum bound, denies admission of cells of subsequent packets to the corresponding buffer, thereby maintaining tributary queue length for the VC.

5. The invention as recited in claim 3, wherein the counter includes a maximum bound set as either a) the threshold value or b) a value based on the effective buffer size provisioned for the packet connection associated with the corresponding buffer.

6. The invention as recited in claim 1, wherein the buffer controller only drops previously enqueued cells and the EOP cell of the current packet and retains cells of any complete packet.

7. The invention as recited in claim 1, wherein the apparatus is one of a set in a node and each of the set is a associated with a traffic class and receives one or more VCs having the same traffic class.

8. The invention as recited in claim 7, wherein an output packet stream of each unit is applied to a corresponding output buffer, and the node further comprises:
   an egress subport scheduling processor configured to transfer packets in each output buffer to a combined output packet stream, wherein the egress subport scheduling processor serves the output buffer of each of the set of units in accordance with a scheduling method to generate the combined output packet stream.

9. The invention as recited in claim 1, further comprising a threshold processor generating each threshold value as a dynamic threshold value in accordance with either an early packet discard method or a random packet discard method.

10. The invention as recited in claim 1, wherein the unit is contained in a node operating in accordance with an asynchronous transfer mode standard.

11. The invention as recited in claim 1, wherein the circuit is embodied in an integrated circuit.

12. A method of merging of data packets for one or more virtual circuits, the method comprising the steps of:
   (a) receiving, in one or more buffers, corresponding cells of an associated VC and a threshold value based on traffic of the VC,
   (b) setting, when a number of cells of a packet in a buffer exceeds the corresponding dynamic threshold value, a corresponding flag of the buffer;
   (c) dropping all cells of the current packet in response to a set flag of a corresponding buffer; and
   (d) servicing each buffer in accordance with a scheduling method to transfer one or more packets from each buffer to an output packet stream.

13. The invention as recited in claim 12, wherein step (c) comprises the steps of:
   (c1) denying further admission to the buffer of cells for the current packet to the buffer while its flag is set,
   (c2) dropping any current enqueued cells for the current packet in the buffer and drop each subsequent cell of the packet including its EOP cell, and
   (c3) reset the flag of the corresponding buffer when the EOP cell is dropped to admit cells of a subsequent packet into the buffer.

14. The invention as recited in claim 12, further comprising a counter associated with each buffer, wherein the counter decrements as each cell is enqueued in the corresponding buffer and the counter increments at a rate based on the effective bandwidth of the VC of the corresponding buffer.

15. The invention as recited in claim 14, wherein each counter includes a minimum bound, and the buffer controller, in response to a counter reaching its minimum bound, denies admission of cells of subsequent packets to the corresponding buffer, thereby maintaining tributary queue length for the VC.

16. The invention as recited in claim 14, wherein the counter includes a maximum bound set as either a) the threshold value or b) a value based on the effective buffer size provisioned for the packet connection associated with the corresponding buffer.

17. The invention as recited in claim 12, wherein the buffer controller only drops previously enqueued cells and the EOP cell of the current packet and retains cells of any complete packet.

18. The invention as recited in claim 12, wherein 1) the method is employed by one of a set of units in a node, 2) the method further comprises the step of associating each set with a traffic class, and 3) step (a) receives one or more VCs having the same traffic class.

19. The invention as recited in claim 18, comprising the step of applying an output packet stream of each unit to a corresponding output buffer, and the method further comprises the step of transfering packets in each output buffer to a combined output packet stream by the steps of:

serving the output buffer of each of the set of units in accordance with a scheduling method, and generating the combined output packet stream based on the scheduling method.

20. The invention as recited in claim 12, further comprising the step of generating each threshold value as a dynamic threshold value in accordance with either an early packet discard method or a random packet discard method.

21. The invention as recited in claim 12, wherein the method operates in a node in accordance with an asynchronous transfer mode standard.

22. The invention as recited in claim 12, wherein the method is implemented by at least one processor embodied in an integrated circuit.

23. A computer-readable medium having stored thereon a plurality of instructions, the plurality of instructions including instructions which, when executed by a processor, cause the processor to implement a method for coordinating merging of packets for one or more virtual circuits, the method comprising the steps of:

(a) receiving, in one or more buffers, corresponding cells of an associated VC and a threshold value based on traffic of the VC, (b) setting, when a number of cells of a packet in a buffer exceeds the corresponding dynamic threshold value, a corresponding flag of the buffer;

(c) dropping all cells of the current packet in response to a set flag of a corresponding buffer; and (d) servicing each buffer in accordance with a scheduling method to transfer one or more packets from each buffer to an output packet stream.

* * * * *